US005664229A

United States Patent [19]

Bhargava et al.

[11] Patent Number: 5,664,229

[45] Date of Patent: Sep. 2, 1997

[54] ACCESSORY FOR CONVERSION WITH HOUSING WITH FIRST CONNECTION INCLUDES HOST CABLE AND HOST CONNECTOR AND SECOND CONNECTION INCLUDING A PLUG-IN MODULAR CONNECTOR

[75] Inventors: Vikram Bhargava, Coram; Daniela Stratienco, Patchogue; Timothy Kehoe, Smithtown, all of N.Y.

[73] Assignee: Symbol Technologies, Inc., Holtsville, N.Y.

[21] Appl. No.: 443,849

[22] Filed: May 18, 1995

[51] Int. Cl.$^6$ .................... G06F 5/00

[52] U.S. Cl. .................... 395/885; 395/831; 395/882; 395/500; 235/462; 235/472

[58] Field of Search .................... 235/462, 472; 395/821, 831, 882, 885, 500

[56] References Cited

U.S. PATENT DOCUMENTS

| | | | |
|---|---|---|---|
| 3,684,925 | 8/1972 | Naff, Jr. | 361/688 |
| 4,369,361 | 1/1983 | Swartz et al. | 235/470 |
| 4,485,439 | 11/1984 | Rothstein | 395/500 |
| 4,972,470 | 11/1990 | Farago | 380/3 |
| 5,030,111 | 7/1991 | Eastman | 439/470 |
| 5,483,052 | 1/1996 | Smith, III et al. | 235/472 |

*Primary Examiner*—Thomas C. Lee
*Assistant Examiner*—Anderson I. Chen
*Attorney, Agent, or Firm*—Kirschstein, et al.

[57] ABSTRACT

An interface arrangement is connected between a scanning head for electro-optically reading bar code symbols and a host device having a host processor operative for processing signals with a predetermined data exchange format. The interface arrangement includes a housing; a first connector on the housing for direct connection to the host device; a second connector on the housing for direct connection to a head cable connected to the scanning head; and a conversion circuit within the housing for converting decoded signals generated in the head into data signals having a format compatible with the predetermined data exchange format of the host processor.

5 Claims, 2 Drawing Sheets

ACCESSORY FOR CONVERSION WITH HOUSING WITH FIRST CONNECTION INCLUDES HOST CABLE AND HOST CONNECTOR AND SECOND CONNECTION INCLUDING A PLUG-IN MODULAR CONNECTOR

REFERENCE TO RELATED APPLICATIONS

This application is related to two U.S. patent applications Ser. No. 08/443,851, filed May 18, 1995 now abandoned and Ser. No. 08/443,850, filed May 18, 1995 still pending.

BACKGROUND OF THE INVENTION

1. Field of the Invention

This invention generally relates to a snap-apart housing for an interface arrangement for making an apparatus for electro-optically reading indicia having parts of different light reflectivity, for example, bar code or matrix array symbols, compatible with different devices, such as host processors, transaction systems, transaction terminals, video cassette recorders, facsimile machines, video cameras, television boxes and like electronic devices, having data processors which operate with different data exchange formats.

2. Description of the Related Art

Various optical readers and optical scanning systems have been developed heretofore for reading indicia such as bar code symbols appearing on a label or on the surface of an article. The bar code symbol itself is a coded pattern of indicia comprised of a series of bars of various widths spaced apart from one another to bound spaces of various widths, the bars and spaces having different light reflecting characteristics. The readers in scanning systems electro-optically transform the graphic indicia into electrical signals, which are decoded into alphanumeric characters that are intended to be descriptive of the article or some characteristic thereof. Such characteristics are typically represented in digital form and utilized as an input to a data processing system for applications in point-of-sale processing, inventory control and the like.

Scanning systems of this general type have been disclosed, for example, in U.S. Pat. Nos. 4,251,798; 4,369,361; 4,387,297; 4,409,470; 4,760,248; 4,896,026, all of which have been assigned to the same assignee as the instant application. As disclosed in some of the above patents, one embodiment of such a scanning system resides, inter alia, in a hand-held, portable laser scanning device supported by a user, which is configured to allow the user to aim the scanning head of the device, and more particularly, a light beam, at a targeted symbol to be read.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used as is the actual size of the bars and spaces. The number of characters (represented by the bar code symbol) is referred to as the density of the symbol. To encode the desired sequence of the characters, a collection of element arrangements are concatenated together to form the complete bar code symbol, with each character of the message being represented by its own corresponding group of elements. In some symbologies, a unique "start" and "stop" character is used to indicate when the bar code begins and ends. A number of different bar code symbologies exist, these symbologies including UPC/EAN, Code 39, Code 128, Codeabar, and Interleaved 2 of 5, etc.

In the laser beam scanning systems known in the art, the laser light beam is directed by a lens or other optical components along the light path toward a target that includes a bar code symbol on a surface of the target. A moving-beam scanner operates by repetitively scanning the light beam in a line or series of lines across the symbol by means of motion of a scanning component, such as the light source itself or a mirror disposed in the path of the light beam. The scanning component may either sweep the beam spot across the symbol and trace a scan line across the pattern of the symbol, or scan the field of view of the scanner, or do both.

Bar code reading systems also include a sensor or photodetector which detects light reflected or scattered from the symbol. The photodetector or sensor is positioned in the scanner in an optical path so that it has a field of view which ensures the capture of a portion of the light which is reflected or scattered off the symbol. The captured light is detected and converted into an electrical signal. Electronic circuitry and software decode the electrical signal into a digital representation of the data represented by the symbol that has been scanned. For example, the analog electrical signal generated by the photodetector is converted by a digitizer into a pulse width modulated digitized signal, with the widths corresponding to the physical widths of the bars and spaces. Such a digitized signal is then decoded, based on the specific symbology used by the symbol, into a binary representation of the data encoded in the symbol, and subsequently to the alphanumeric characters so represented.

The decoding process of known bar code reading systems usually works in the following way. The decoder receives the pulse width modulated digitized signal from the digitizer, and an algorithm, implemented in the software, attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available. Such a signal is then decoded according to the specific symbology into a binary representation of the data encoded in the symbol, and to the alphanumeric characters so represented.

Moving-beam laser scanners are not the only type of optical instrument capable of reading bar cede symbols. Another type of bar code reader is one which incorporates detectors based on charge coupled device (CCD) technology. In such readers the size of the detector is typically smaller than the symbol to be read because of the image reduction by the objective lens in front of the CCD. The entire symbol is flooded with light from a light source such as light emitting diodes (LED) in the scanning device, and each CCD cell is sequentially read out to determine the presence of a bar or a space.

The interfacing of scanning heads with host devices having data processors utilizes arrangements such as described in U.S. Pat. No. 5,258,604. In such prior art arrangements, the interface arrangement has circuitry for storing and applying an identification code representing the identity of a selected one of a plurality of input/output (I/O) devices to the decoder of the scanner, for operating the decoder, and for transferring decoded signals and command signals between the selected one of the I/O devices and the decoder.

SUMMARY OF THE INVENTION

OBJECTS OF THE INVENTION

It is a general object of the present invention to provide an improved construction of an interface arrangement for use in a bar code data processing system.

It is another object of the invention to provide an accessory that can be used to quickly and easily interconnect and disconnect an all-purpose scanning head with a selected one of a plurality of host devices each having a different data processor.

Additional objects, advantages and novel features of the present invention will become apparent to those skilled in the art from this disclosure, including the following detailed description, as well as by practice of the invention.

While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

FEATURES OF THE INVENTION

Briefly described, and in general terms, the present invention provides a novel construction of an interface arrangement or accessory for interconnecting a host device and a scanning head of an electro-optical system for reading coded indicia, e.g., bar code symbols. The interface arrangement includes circuitry for processing and translating bar code and control signals, including digitized decoded signals, into data configurations or packets (formats or protocols) recognizable by one of a plurality of different processor-based host devices, such as computers, host processors, transaction systems, cash registers or transaction terminals, consumer devices, etc. Utilizing the construction of the arrangement of the present invention, a user has the ability to quickly and easily interface an all-purpose, generic scanning head of the scanner with a selected host device by selecting the appropriate one of a plurality of different interface arrangements that is physically designed to plug directly into a connector on the host device, thereby automatically providing compatibility with the scanning head.

The construction includes a housing; first connection means on the housing for direct connection to the host device; second connection means on the housing for direct connection to a head cable connected to the scanning head; and conversion means mounted within the housing for converting the digital decoded signals from the scanning head into digital data signals having a format compatible with the host device's predetermined data exchange format.

The housing has upper and lower parts preferably constituted of a moldable synthetic plastic material. The conversion means includes a printed circuit board on which a plurality of integrated circuit chips are mounted on both sides thereof. The board rests on integrally molded supports and is captured and held in place by snap-type action by integrally molded fasteners that advantageously engage both sides of the circuit board.

The novel features and characteristics of the invention are set forth in the appended claims. The invention itself, however, as well as other features and advantages thereof, will be best understood by reference to a detailed description of a specific embodiment, when read in conjunction with the accompanying drawings.

DETAILED DESCRIPTION OF THE PREFERRED EMBODIMENTS

The invention relates to electro-optical readers of the type generally described in the above-identified patents for reading bar code symbols. As used in this specification and the claims, the term "bar code symbol" is intended to be broadly construed and to cover not only one-dimensional symbol patterns composed of alternating bars and spaces arranged in a row, but also other graphic patterns, such as dot or two-dimensional matrix array patterns, as well as alphanumeric characters and, in short, any indicia having portions of different light reflectivity.

Figure 1:
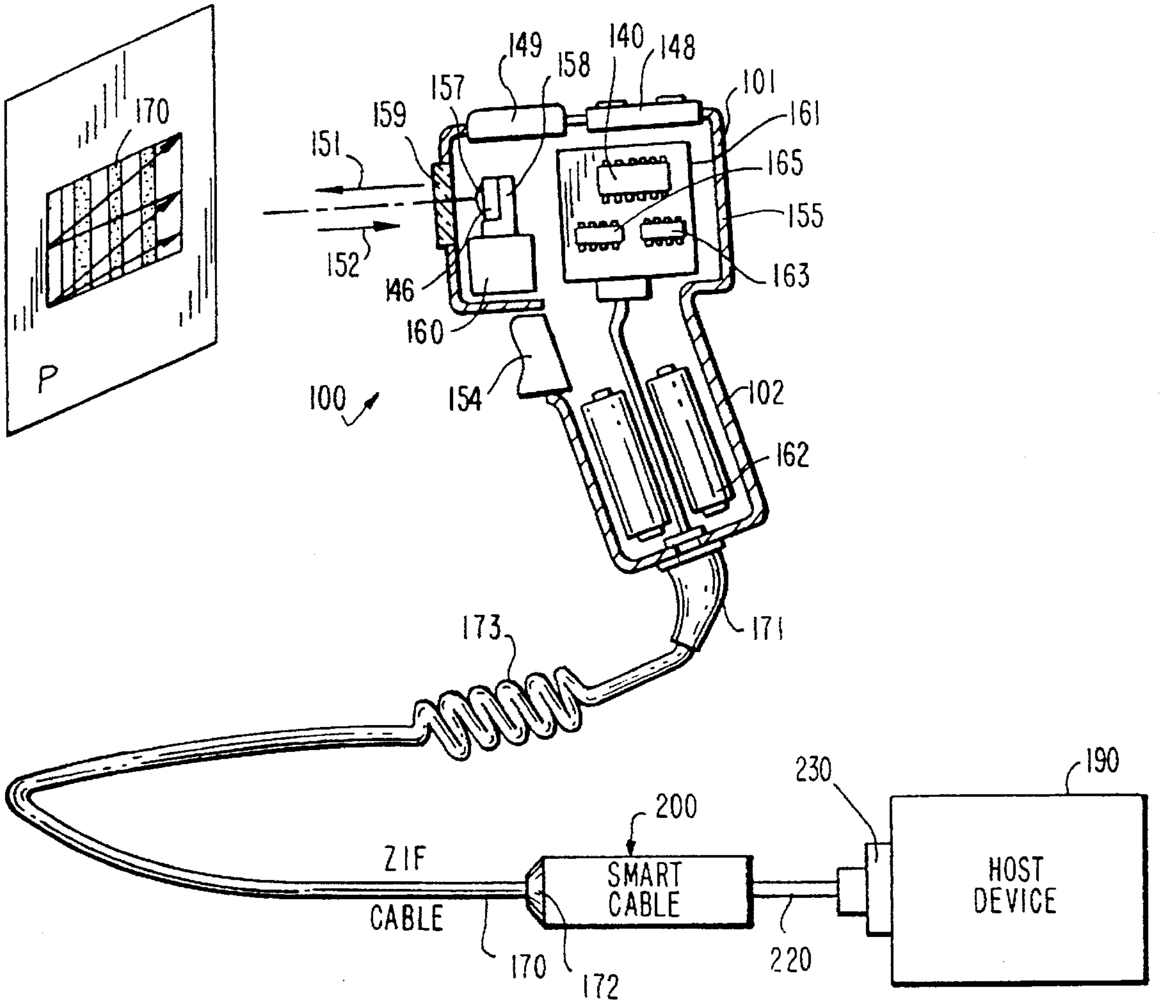
FIG. 1 is a highly simplified diagrammatic view of a construction of an interface arrangement according to the present invention for interconnecting a bar code data processing system with a host device.

As a preferred embodiment, we describe the implementation of the present invention for a hand-held, laser-scanning, bar code reader unit such as illustrated in FIG. 1. This hand-held device of FIG. 1 is generally of the style disclosed in U.S. Pat. No. 4,760,248, issued to Swartz, et al., assigned to Symbol Technologies, Inc., and also similar to the configuration of a bar code reader commercially available as part number LS 2000 or LS 3000 from Symbol Technologies, Inc. Alternatively, or in addition, features of U.S. Pat. No. 4,387,297 issued to Swartz, et at., or U.S. Pat. No. 4,409,470 issued to Shepard, et al., both such patents being assigned to Symbol Technologies, Inc., may be employed in constructing the bar code reader unit of FIG. 1. These U.S. Pat. Nos. 4,760,248; 4,387,297 and 4,409,470 are incorporated herein by reference.

Referring now to the drawings, reference numeral 100 generally identifies a hand-held, gun-shaped, retro-reflective scanner head or reader unit having a barrel 101 and a pistol-grip handle 102. A manually-operable trigger 154 is situated below the barrel 101 on an upper, forwardly-facing part of the handle 102. As known from the above-identified patents incorporated by reference herein, a light source component, typically, but not necessarily, a laser diode 158 is mounted inside the head 100.

The operation of the reader unit 100 is as follows: An outgoing light beam 151 is generated in the reader 100, by the laser diode 158 or like light source. The beam 151 is directed outwardly through a window 159 that faces the indicia, e.g., a bar code symbol 170 located at a reference plane P spaced at a distance from the front of the reader unit. The beam 151 is either immediately transmitted through the window 159 as shown, or is directed to a generally planar reflector which, in turn, reflects the beam 151 through the window. The outgoing light beam 151 is scanned by scanning drive component 160 in a fixed linear pattern which produces a visible scan line on the symbol. The user positions or orients the hand-held unit so this scan line traverses all of the bars of the symbol to be read.

Reflected light 152 from the symbol is detected by a light-responsive device or detector 146 in the reader unit, producing serial electrical signals to be processed for decoding the information contained in the bar code. The movable trigger 154 is employed to allow the user to activate the light beam 151 and/or associated signal processing and command circuitry only after the user has pointed the unit at the symbol to be read, thereby ensuring that the correct target is read if there is more than one target in the field of view, and also saving battery life if the unit is self-powered.

The reader unit 100 is designed to be aimed at a bar cede symbol by the user from a position where the reader unit 100 is spaced from the symbol, i.e., not touching the symbol or moving across the symbol. Typically, this type of hand-held bar code reader is specified to operate in the range of perhaps several inches.

A lightweight plastic housing 155 contains the laser diode 158, the detector 146, optics 157, the scanning drive component 160, signal processing circuitry 165, decoder circuitry 163, and a central processing unit (CPU) 140, as well as batteries 162. The light-transmissive window 159 at the front end of the housing 155 allows the outgoing light beam 151 to exit and the incoming reflected light 152 to enter. A keyboard 148 and a display 149 are also mounted on the housing.

As seen in FIG. 1, the optics include a suitable lens 157 (or multiple lens system) used to collimate and focus the scanned beam 151 onto the bar code symbol at the reference plane, and this same lens 157 may be used to focus the reflected light 152 onto the detector 146. The light source 158 is positioned to introduce the emitted light beam into the optical axis of the lens 157 by appropriate beam-shaping structure when the trigger 154 is pulled. If the light produced by the source 158 is not visible, an aiming light may be included in the unit to introduce a visible beam into the light path coaxially with the lens 157. The aiming light, if needed, produces a visible light spot which is scanned just like the laser beam 151. The user may employ this visible light to aim the reader unit at the symbol before pulling the trigger 154 to activate the scanning.

The photodetector 146 generates an electrical analog signal indicative of the variable intensity of the reflected light 152. This analog signal is converted into a digitized signal by a digitizer circuit 165. This digitized signal is transferred to a decoder circuit or module 163 located interiorly of the head 100. The decoder circuit 163 decodes the digitized signal into a decoded signal or data represented by (encoded in) the symbol, representing such data in digital form, such as ASCII characters. The digitizer circuit 165, the decoder circuit 163 and the CPU 140 are all mounted on a printed circuit board 161 within the head 100. This digital decoded data is then formatted into a communications packet according to a protocol procedure, and transmitted along an external head cable 170, designated in FIG. 1 as a "ZIF" cable. An external host device 190, usually a computer having a data processor with a predetermined data exchange format, serves mainly as a data store in which the decoded data generated by the decoder circuit 163 is stored for subsequent processing.

As described so far, the reader unit or head 100 is customized to each host device. Since different host devices have different data exchange formats for their microprocessors, each head 100 is specifically designed to work only with one host device. This is not desirable, especially in environments with multiple host devices.

Figures 2, 3, 4:
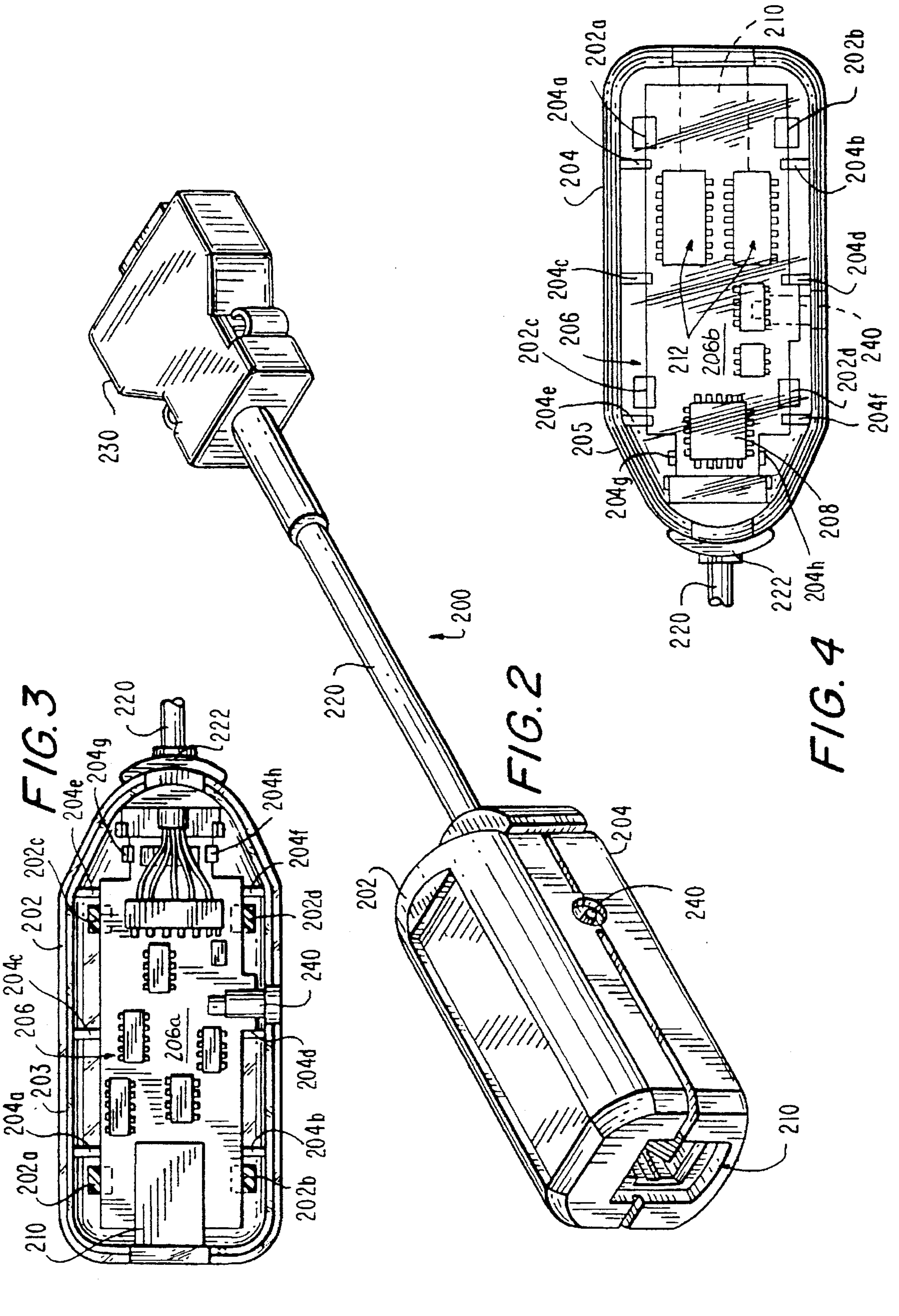
FIG. 2 is a perspective view of one embodiment of the interface arrangement according to the present invention.
FIG. 3 is a broken-away top plan view of a second embodiment of the interface arrangement as seen through a transparent housing according to the present invention.
FIG. 4 is a broken-away bottom plan view of the embodiment of FIG. 3 as seen through the transparent housing.

An interface arrangement or so-called "smart cable" 200 is connected between the head cable 170 and any selected host device 190. FIG. 2 illustrates a perspective view of one embodiment of the interface arrangement 200 according to the present invention. As depicted in FIGS. 2–4, the arrangement 200 includes a generally parallelepiped housing having an upper part 202, a lower part 204, and a printed circuit board 206 mounted between the parts in the housing. The board 206 rests on a plurality of ribs or supports 204*a, b, c, d, e* and *f* molded integral with the lower housing part 204. The ribs are spaced apart of one another lengthwise of the housing. A plurality of resilient snap-type fasteners 204*g, h* is also integrally mounted with the housing in a spaced-apart relationship. These fasteners engage with a snap-type action at least one side 206*a* of the circuit board 206.

As shown in FIG. 4, an opposite side 206*b* of the board 206 is engaged by a snap-type action by a plurality of resilient snap-type fasteners 202*a, b, c* and *d* which are molded integrally with the upper housing part 202. The board 206 is thus captured and held securely in place within the housing at both of its opposite sides.

A peripheral rim 203 on one of the housing parts is received with a snap-type action with another peripheral rim 205 provided on the other of the housing parts. This snapping engagement allows the housing parts to be quickly assembled and disassembled.

As shown in FIG. 4, a microcontroller 208 is mounted on side 206*b* of the circuit board 206. A communications circuit 212 consisting of multiple integrated circuit chips is preferably mounted on both sides 206*a*, 206*b* of the circuit board 206. A female-type RJ modular connector 210 is mounted at one end of the housing.

As shown in FIG. 1, the head cable 170 has a connector 171 at one end which is removably connected to the bar code reader unit 100 and is electrically connected to the decoder circuit 163. The head cable 170 transfers the decoded data in packet form. The cable 170 has a male-type RJ connector 172 permanently connected to the opposite end thereof. The cable 170 has a coiled section 173 intermediate its ends. The RJ female connector 210 communicates with the exterior of the housing for removably receiving via a plug-h, snap-type connection, the male connector 172.

Conversion means are provided on the arrangement 200. The conversion means includes the microcontroller 208 and the communications hardware circuitry 212. The conversion means is operative for converting the format of the data packets into digital signals whose data exchange format is compatible with the host device.

A host cable 220 having a plurality of individual conductors has one end 222 permanently fastened to the housing 202, 204. The host cable 220 extends exteriorly thereof to an opposite end host connector 230 for removably connecting the microcontroller 208 and the communications hardware circuitry to the host device 190.

A power supply connector 240 and power switch are also provided for the arrangement. The power supply connector 240 is accessible at the side of the housing.

The host device can be any processor-based equipment, e.g., a computer, a cash register, a scale, a printer and, in fact, such commercial devices as video cassette recorders, facsimile machines, video cameras and television boxes are also within the spirit of this invention.

While the invention has been illustrated and described as embodied in a snap-apart housing for use in an interface arrangement for coded data processing systems, it is not intended to be limited to the details shown, since various modifications and structural changes may be made without departing in any way from the spirit of the present invention.

Without further analysis, the foregoing will so fully reveal the gist of the present invention that others can readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. An accessory for interconnecting a scanning head for electro-optically reading coded symbols and for transmitting decoded signals along a head cable connected to the head, and a host device having a data processor with a predetermined data exchange format for receiving the decoded signals, comprising:

a housing located externally of the scanning head and the host device;

first connection means on the housing for detachable connection to the host device wherein said first connection means includes a host cable having one end fixedly connected to said housing, and a host connector at an opposite end of the host cable;

second connection means including a plug-in modular connector on the housing and accessible at an exterior surface of said housing for detachable connection to the head cable;

conversion means within the housing connected to both connection means in a condition of use, and operative for converting the decoded signals from the scanning head into digital data signals having a format compatible with the predetermined data exchange format of the host device; and said housing and both connection means being mechanically interconnected as a portable, unitary assembly separate from the scanning head and the host device when not is said condition of use.

2. The accessory of claim 1, wherein said conversion means includes electrical circuitry mounted on a printed circuit board having opposite surfaces; and further comprising means for supporting the circuit board securely within said housing at both opposite surfaces of the board.

3. The accessory of claim 2, wherein said supporting means includes a plurality of supports and fasteners both integrally molded with said housing, said fasteners engaging both said surfaces of the board with a snap-type action.

4. The accessory of claim 3, wherein said housing includes a pair of housing parts interfitted with each other.

5. The accessory of claim 4, wherein said supports and fasteners are integrally molded with said housing parts.

* * * * *